US006086317A

United States Patent [19]

Kameoka

[11] Patent Number: 6,086,317

[45] Date of Patent: Jul. 11, 2000

[54] ARTICLE INVERTER

[75] Inventor: George Y. Kameoka, Petaluma, Calif.

[73] Assignee: KVAL Inc., Petaluma, Calif.

[21] Appl. No.: 09/401,746

[22] Filed: Sep. 23, 1999

[51] Int. Cl.[7] .......... B25J 11/00

[52] U.S. Cl. .......... 414/772; 269/905; 414/759; 414/816

[58] Field of Search .......... 269/905; 414/684.3, 414/758, 759, 761, 762, 772, 816

[56] References Cited

U.S. PATENT DOCUMENTS 3,625,504 12/1971 Walker .......... 269/905 X
4,531,720 7/1985 Söder .......... 269/905 X
5,725,205 3/1998 O'Berg .......... 269/905 X

FOREIGN PATENT DOCUMENTS 59-108647 6/1984 Japan .......... 414/772

*Primary Examiner*—Janice L. Krizek
*Attorney, Agent, or Firm*—Corwin R. Horton

[57] ABSTRACT

A method and apparatus for inverting planate articles, such as door and window assemblies, which are supported from below in the horizontal plane, such as at a workstation for carrying out fabrication procedures from above the article. The article is tilted to a near vertical position at a tilting station, moved horizontally away to provide clearance from the tilting station, rotated a half turn about its vertical axis, returned to the tilting station and tilted back to the horizontal attitude with the original underside now on top. A tilt table that rotates around a transverse axis intermediate its length supports the article at the horizontal and tilts it to the near vertical attitude. A carriage receives the tilted article from the tilt conveyer and supports it at the near vertical by a turntable on the carriage having supports that engages the leading end and back side of the article. The carriage is movable to and from a location a distance from the tilt table for rotating the turntable a half turn at that location. The carriage is returned to the tilt table location for transfer back to the tilt table for tilting back to the horizontal in the inverted mode.

19 Claims, 13 Drawing Sheets

ARTICLE INVERTER

BACKGROUND OF THE INVENTION

This invention relates to equipment for inverting planate workpieces or other articles, particularly large flat workpieces, such as prefabricated door and window assemblies. This equipment is particularly useful for operations in which the planate workpiece is supported in the horizontal plane for carrying out assembly and other fabrication procedures. Access to the underside of the workpiece is necessary for various procedures and such access is quite difficult without inverting the workpiece so that the other side may be worked on from above. Heretofore, planate articles supported in a horizontal attitude have been inverted by rotation a full 180 degrees about a horizontal axis. Typically, the workpiece is raised above its horizontal support in order to be "flipped" to the other side. However, inverting the article in this fashion requires a large amount of "head room" above the horizontal support, particularly for tall and/or wide planate articles. Typically, the article also must be supported against free fall during rotation and repositioning of it on the support to avoid damage. Such procedures usually require complex and bulky equipment.

There is therefore a need for more efficient procedures and equipment for inverting planate articles.

SUMMARY OF THE INVENTION

This invention relates to a method and apparatus for inverting planate workpieces or other articles, particularly large flat workpieces, such as prefabricated door and window assemblies. This equipment and procedure is particularly useful for operations in which a planate workpiece is supported from below in a horizontal attitude for carrying out assembly and other fabrication procedures.

In the method of this invention planate articles which are borne or carried in a horizontal attitude are inverted to reverse the planate sides so that the former underside is on top. In this method the planate articles are tilted, in the direction of a major axis thereof, downwardly at a leading end, from the horizontal to a near vertical attitude, rotated a half turn about the axis, and then tipped back to the horizontal position.

As another feature of the method of this invention, the article is supported along its length from underneath in the horizontal position and then after tilting it is supported at the leading end in the near vertical attitude for rotation. After rotation 180 degrees the article is tilted back up to the horizontal to again be supported along its length from underneath.

As yet another feature of the method, prior to tilting the article in its near vertical attitude, it is moved horizontally away from the location to which it was tilted in order to provide clearance for the article to be rotated. Following its rotation, the article is returned to that location fir tilting back to the horizontal.

In the apparatus of this invention a tiltable support means, such as a tilt table, is advantageously employed for supporting the planate article from underneath in the horizontal attitude and for tilting it downwardly at a leading end, in the direction of a major axis of the article, to the near vertical attitude. Means are provided to hold the article from sliding off the leading end of the tiltable support means when the article is tilted to the near vertical, desirably an curb or stop projecting above the support means, such as a ledge at the leading end of a tilt table. Means, such as a carriage adapted to cradle the article at its leading end, are provided to receive the article from the tilt table, to support the article at its leading end and to carry the article, thus supported, to and from a location away from the tiltable support means. Means are further provided, such as a rotatable carrier on the carriage, to facilitate rotation of article about a vertical axis when at the remote location.

A more specific feature relates to a particular means for transferring support of the leading end of the article, when at its near vertical attitude, between the tiltable support means and the means for receiving and carrying the article to and from a remote location. In this feature the tiltable support means is a tilt table having an end support at its leading end for supporting the leading end of the article. The means for receiving and supporting the article from the tilt table comprises a carriage having a seat for receiving and supporting the leading end of the article that is vertically aligned with the end support on the tilt table when the tilt table is at the near vertical attitude and the carriage is at a retracted position. Means are provided for positioning the tilt table, when at the near vertical attitude at a raised position and at a lowered position. At the raised position, the end support on the tilt table remains above the seat on the carriage. At the lowered position, the end support is below the end support on the carriage. Thus, when the tilt table carrying the article is moved to the lowered position, the seat engages the leading end of the article and support thereof is thereby transferred to the carriage. When the carriage is supporting the article at the retracted position and the tilt table is moved from the lowered position to the raised position the end support on the tilt table engages the leading end of the article to thereby transfer support of the article back to the tilt table.

Another feature of the invention relates to a particularly advantageous means for moving a tilt table between a raised and a lowered position for effecting transfer of support between the tilt table and a carriage for receiving and supporting the article from the tilt table. For moving and supporting the tilt table between a horizontal and near vertical attitudes, the tilt table is provided with a pivot with an axis transverse to its longitudinal direction that is located a distance in the longitudinal direction from the leading end towards its trailing end thereof. The tilt table is rotatable about the pivot downwardly at the leading end from the horizontal to the near vertical attitude. Means are provided, such as a rocker, to support and move the pivot between a vertical location at which the tilt table is at the raised position, and a lower vertical location, at which the tilt table is at the lowered position.

Yet another feature of the invention relates to a particularly advantageous means for receiving and supporting the article from the tilt table. In this feature the article is received and supported at a near vertical attitude in a cradle mounted on the carriage which comprises a seat for supporting the leading end of the article, stop means adjacent the seat in a direction to be forward of the front side of the article, such a curb or cleats, to restrain movement of the leading end of the article in the forward direction and a back support adjacent on the opposite side of the seat from the stop means and located a distance above the seat, to support the back side of the article. The article is received in the cradle at the near vertical with the back thereof leaning against the back support and the leading end sitting on the seat and restrained from forward movement by the stop means.

DETAILED DESCRIPTION OF THE PREFERRED EMBODIMENT

The following description illustrates the manner in which the principles of the invention are applied but is not to be construed as limiting the scope of the invention.

Article inverters of this invention are designed to invert, serially, one or more workpieces or other articles having sufficient planarity to be supported when resting on that side on a horizontal support, such as a conveyor surface. These may include articles having a pair of opposed generally planate sides that are relatively broad in relation to the thickness of the depth of the article and that are bounded by generally parallel top and bottom margins. The invention is particularly suitable for inverting large flat workpieces, such as prefabricated door and door jamb assemblies. This equipment is especially advantageous in operations in which the planate workpiece is supported in the horizontal plane for carrying out assembly and other fabrication procedures. Access to the underside of the workpiece is necessary for various procedures and such access is quite difficult without inverting the workpiece so that the other side may be worked on from above.

The invention will be illustrated with apparatus for inverting prefabricated door and window assemblies. Door and window frames are pre-assembled and integrated units that may be inserted into a stud wall of a building under construction or renovation. These units are typically fabricated at elevated workstations on which they are supported in a horizontal plane for carrying out fabrication procedures from above at the upper side of the units. These workpieces are typically moved onto, off and between workstations by conveying apparatus that also maintains them in a generally horizontal attitude. The inverters of this invention may be employed before one of these stations for inverting the assembly so that the opposite side may be on at that station. However, inverters of this invention may be advantageously employed in a combined inverter and workstation function. That is, they may not only function as an inverter but as they support the workpiece in a horizontal raised position they may be employed as a workstation as well.

Figure 1:
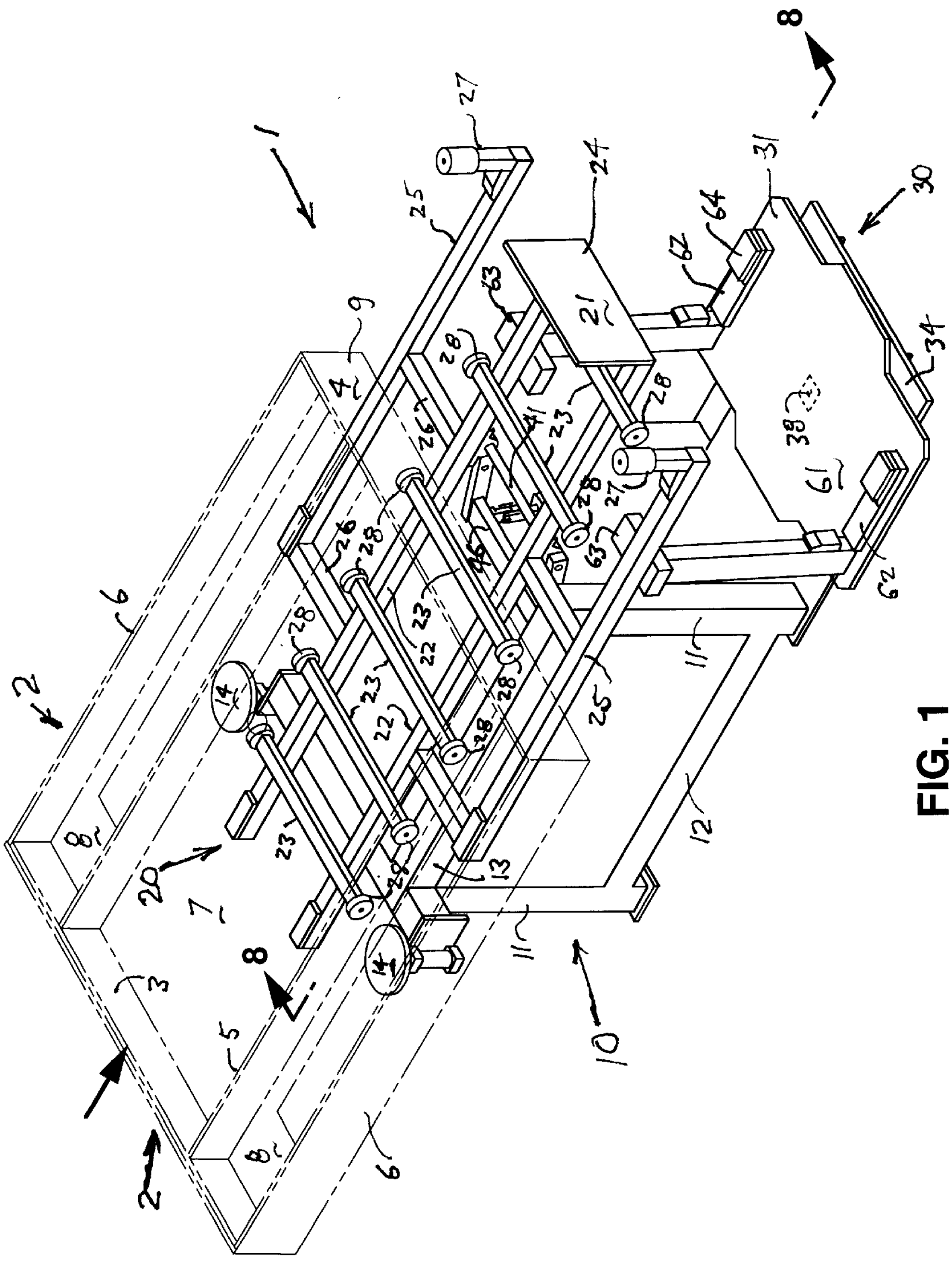
FIG. 1 is an isometric view of an article inverter of this invention with a tilt table in a horizontal attitude and with a carriage in a retracted position and showing, in phantom lines, an article being fed thereto for inversion.
Figure 2:
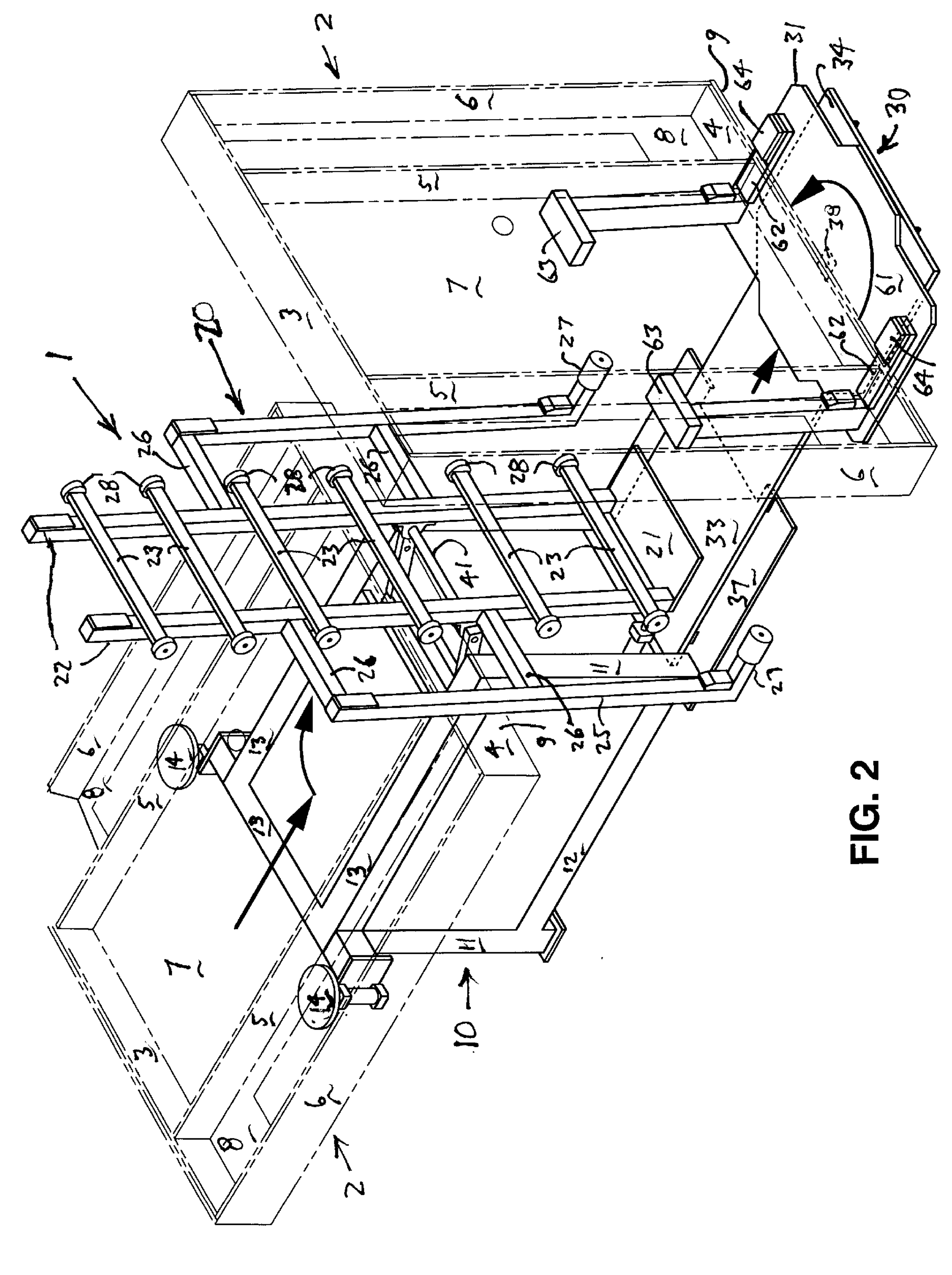
FIG. 2 is the same view of the inverter of FIG. 1 but with the tilt table in a near vertical attitude and the carriage at an extended position and additionally showing, in phantom lines, an article that has been rotated by the inverter from the horizontal to a near vertical position, deposited on the carriage and moved by the carriage to its extended position.
Figure 3:
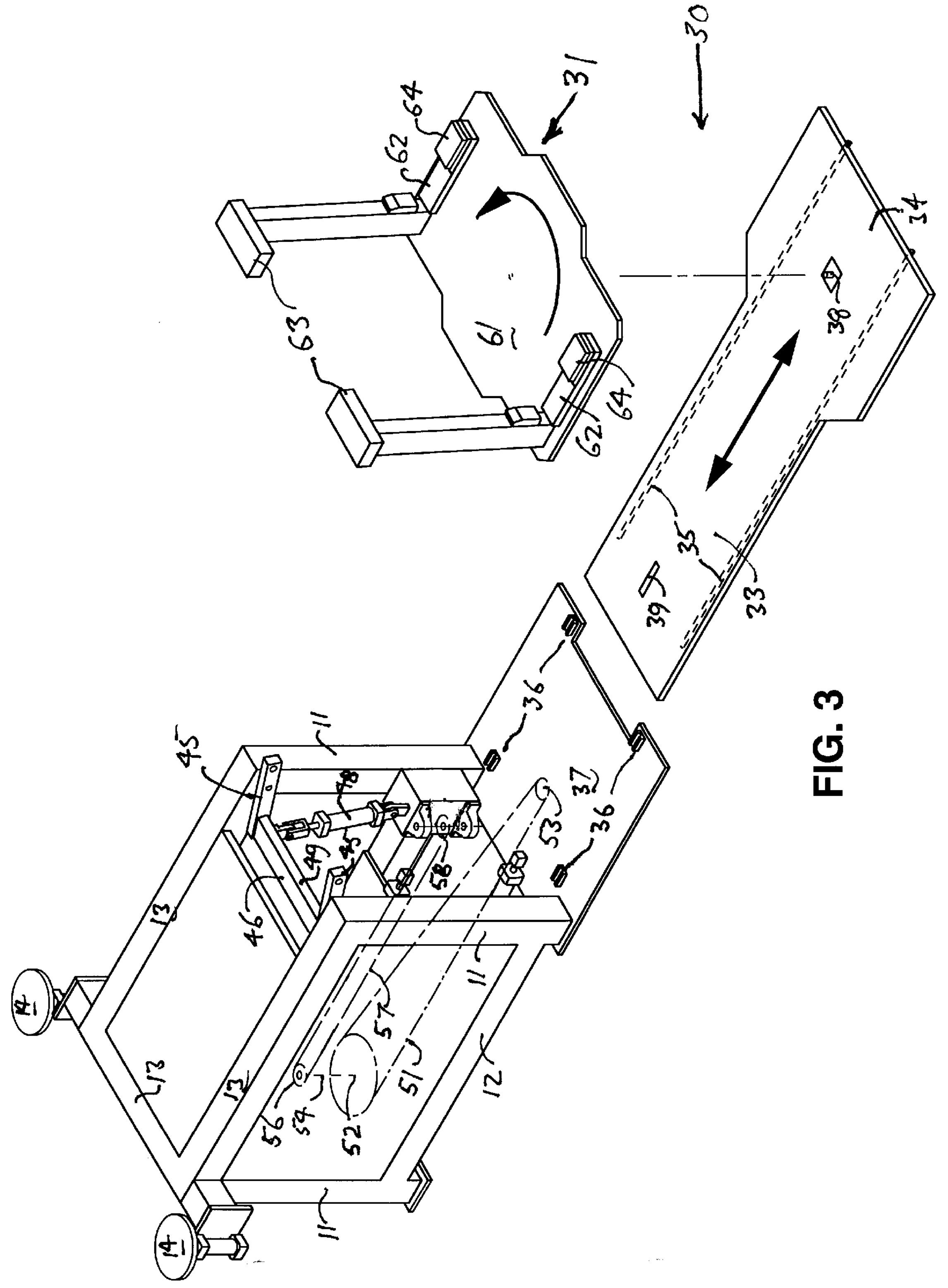
FIG. 3 is an exploded view of the inverter as shown in FIG. 1 illustrating the construction and operation of the carriage.
Figure 4:
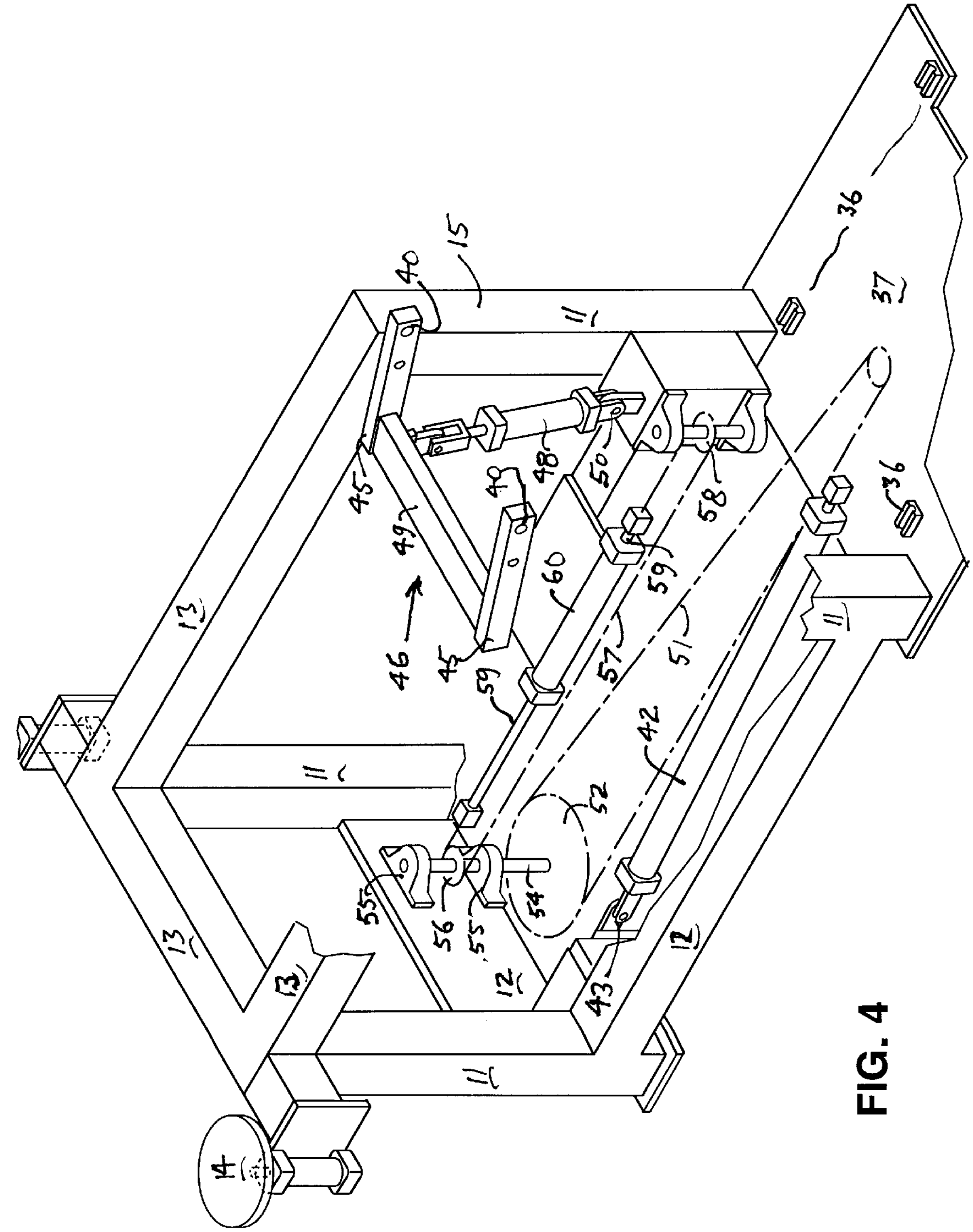
FIG. 4 is an enlarged cut away view of the inverter shown in FIG. 1 illustrating the operating mechanisms for the tilt table and the carriage.
Figure 5:
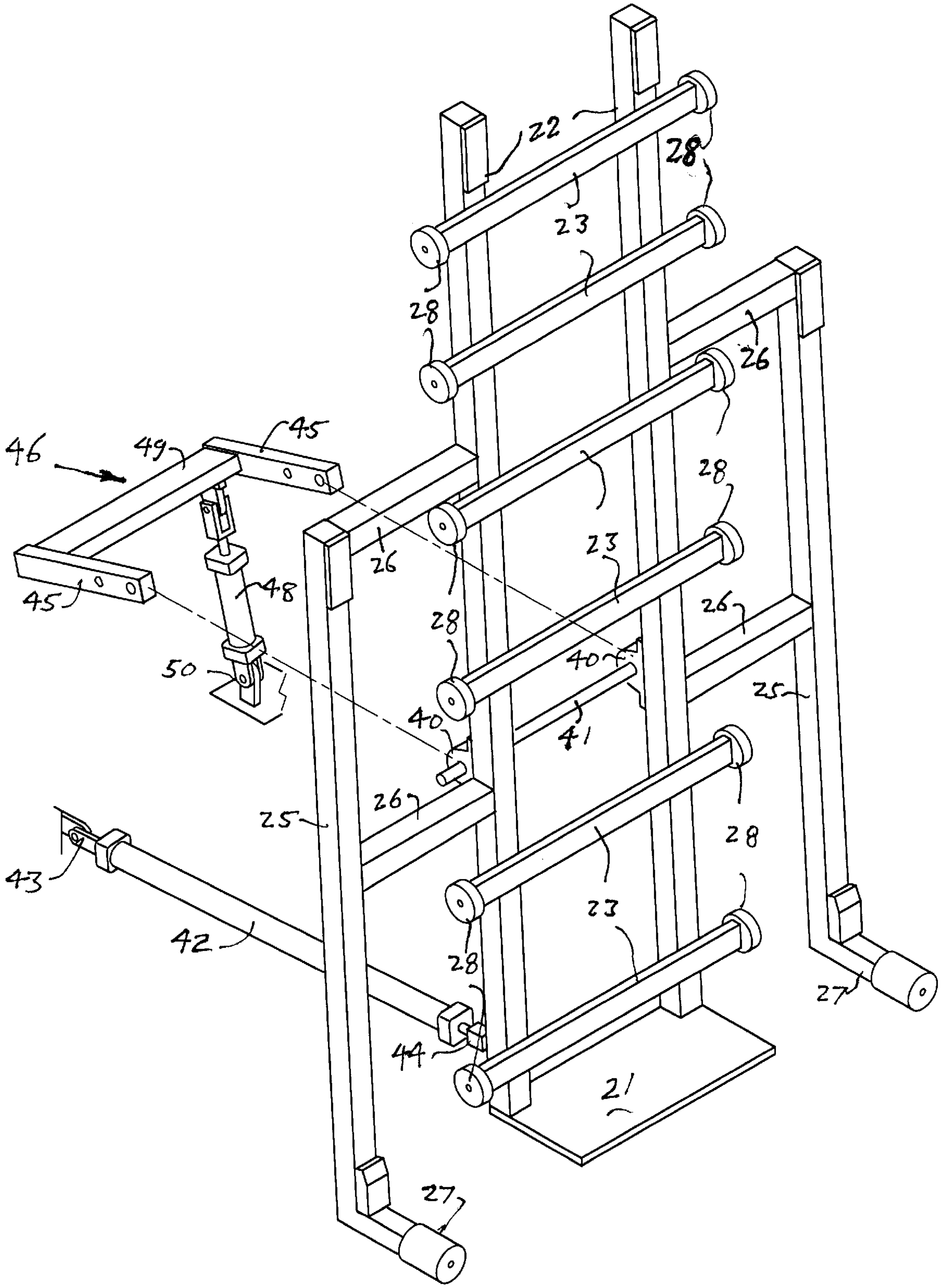
FIG. 5 is an exploded view of the tilt table and operating mechanisms therefor of the inverter shown in FIG. 2.
Figure 6:
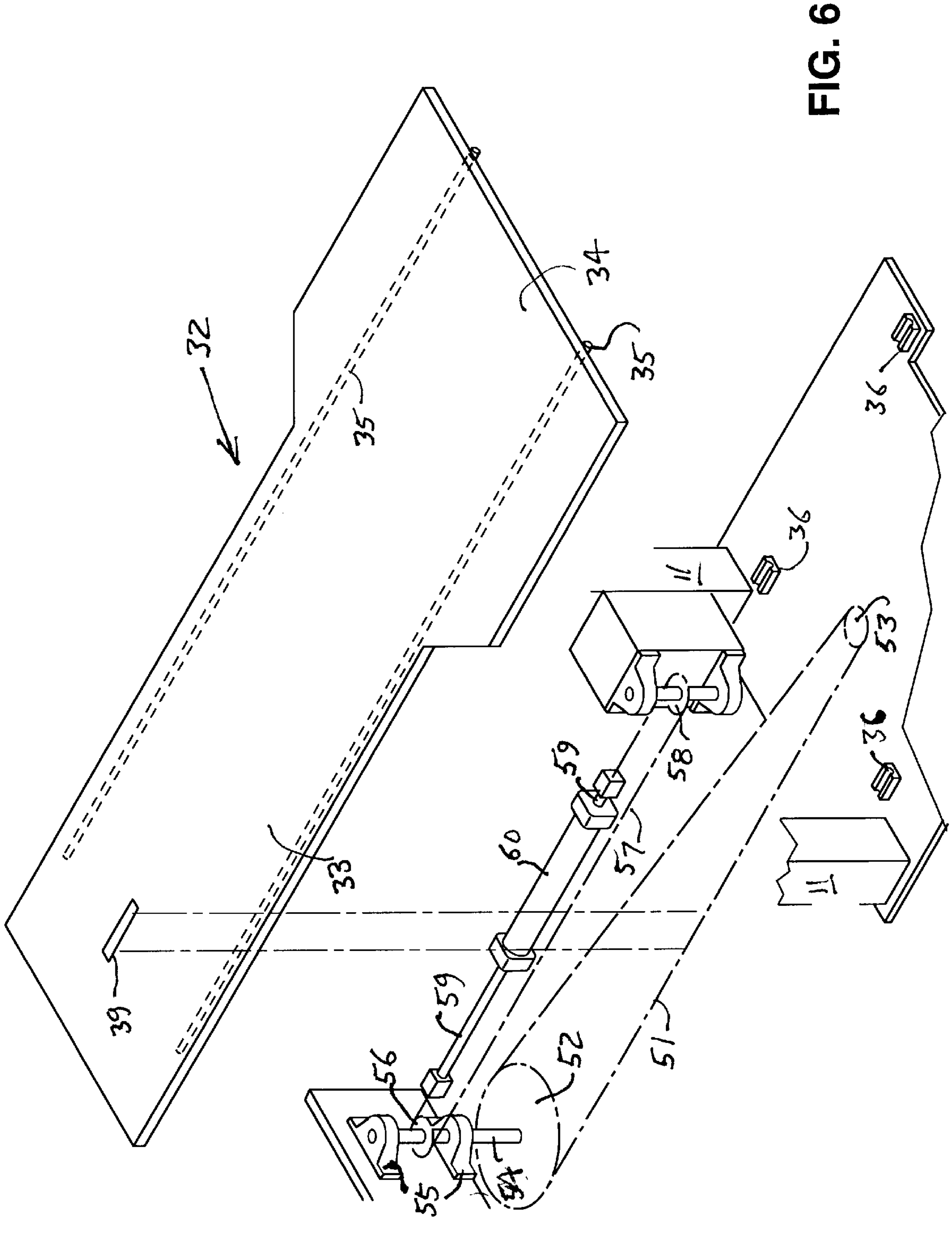
FIG. 6 is an exploded fragmentary view of the platform of the carriage and the operating mechanisms therefor shown in FIG. 1.

For an introductory general description of the inverter and it's operation, FIGS. 1 and 2 of the drawings illustrate an inverter 1 which is composed of a stand 10 which serves to support tilt table 20, carriage 30 and the operators for these components, as will be described. Tilt table 20 is rotatable on stand 10 between a horizontal attitude as shown in FIG. 1 to a near vertical attitude as shown in FIG. 2. Carriage 30 is located at the base of stand 10 and is extendable laterally from stand 10 between a retracted position, as shown in FIG. 1, and an extended position, as shown in FIG. 2. Rotatable turntable 31 is mounted on carriage unit 30 for rotation about a vertical axis.

FIG. 1 shows in phantom outline a typical unit under fabrication, door and window unit 2, the framing for which comprises a header 3, a footer 4 and inner jambs 5 and outer jambs 6. As shown, a door 7 is mounted between inner jambs 5 and windows 8 are mounted at either side, each between an inner jamb 5 and an outer jamb 6. The door and windows of unit 2 are applied at a previous workstation. Typically, at this stage trim pieces, such as beading, and/or aluminum or other cladding will be manually applied at both sides of unit 2.

Door and window unit 2 is fed onto tilt table 20 by a conveying device (not shown) and moved therealong until the leading end 9 of the door unit (footer 4) abuts against support ledge 21 attached to the end of tilt table 20. In the inversion process, door unit 2 is brought to a nearly vertical orientation by rotation of tilt table 20 from the horizontal attitude as shown in FIG. 1 to a near vertical attitude as shown in FIG. 2. Support ledge 21 engages leading end 9 of door unit 2 resting on tilt table 20 support unit 2 when the tilt table is rotated from the horizontal to the near vertical attitude of FIG. 2 to serve as a curb against movement of unit 2 off of tilt table 2.

Carriage 30, when in the retracted position, is at a location to receive and support the door unit 2 when tilt table 20 is tilted to its near vertical attitude. At this attitude support of door unit 2 is transferred to turntable 31 of carriage 30, as will be described in more detail below. Carriage 30, now bearing door unit 2, is moved to the extended position as shown in FIG. 2. Turntable 31 is rotated a half turn, thereby to also rotate door unit 2 a half turn about its vertical axis. The extended position of carriage 30 is at a distance away from stand 10 sufficient to provide clearance therebetween for door unit 2 to be rotated about its vertical axis. Carriage 30 is then moved back to its retracted position and support of door unit 2 transferred back to tilt table 20. Carriage 30 is again moved back to the extended position, to provide clearance, and tilt table 20 is then raised to the horizontal attitude and with it door unit 2, now in the inverted position. Further fabrication operations can then proceed on the upper side of door unit 2 while supported on inverter 1 or after conveying the unit in the same horizontal attitude off of inverter 1 and to a separate workstation.

To now describe inverter 1 in more detail, Stand 10 is comprised of four legs 11 secured together near their lower ends by struts 12 and by beams 13 at their top ends. Beams 13 form a horizontal platform for receiving and supporting tilt table 20 in a horizontal attitude. A vertically adjustable prop 14 is located at each of the two corners adjacent trailing end 29 of tilt table 20. Props 14 may be used as further support for workpieces resting on tilt table 20 in a horizontal attitude, particularly when inverter 1 is also utilized as a workstation.

Tilt table 20 comprises longitudinal frame members 22 bearing cross members 23. Support ledge 21 is fixed to frame members 2 at the leading end 24 of tilt table 20. On either side of tilt table 20 is an outrigger 25, which is connected to longitudinal frame members 22 by struts 26. Outriggers 25 provide lateral support for workpieces carried on tilt table 20 to prevent them form tipping over to either side, particularly when inverter 1 is employed as a workstation. Each outrigger 25 extends to an upright 27 at the end thereof at leading end 24. Uprights 27 on tilt table 20 assist support ledge 21 in supporting door unit 2 when it is rotated to the near vertical.

Together, uprights 27 and ledge 21 act as a curb to prevent the article from sliding off the leading end of 24 of tilt table 20 when the tilt table tilts from the horizontal to a near vertical position.

Cross members 23 are each provided at each end with a roller 28 having a rotational axis that parallels the axis of the cross member and is transverse to the longitudinal direction of tilt table 20. Rollers 28 support and facilitate conveyance of workpieces onto and off of tilt table 20 in the longitudinal direction thereof.

Figure 8:
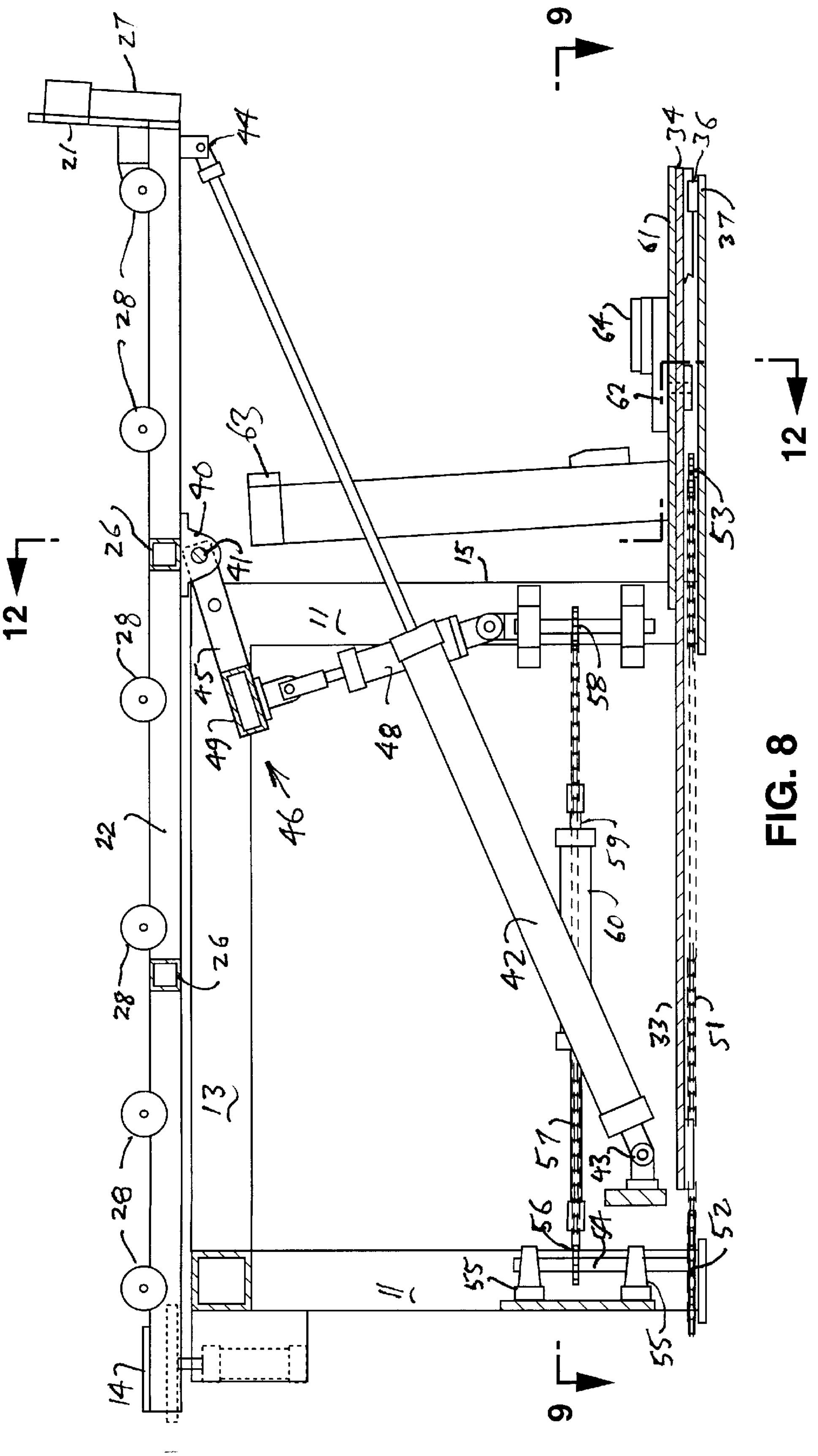
FIG. 8 is a sectional view of the inverter shown in FIG. 1, taken along lines 8—8.
Figure 9:
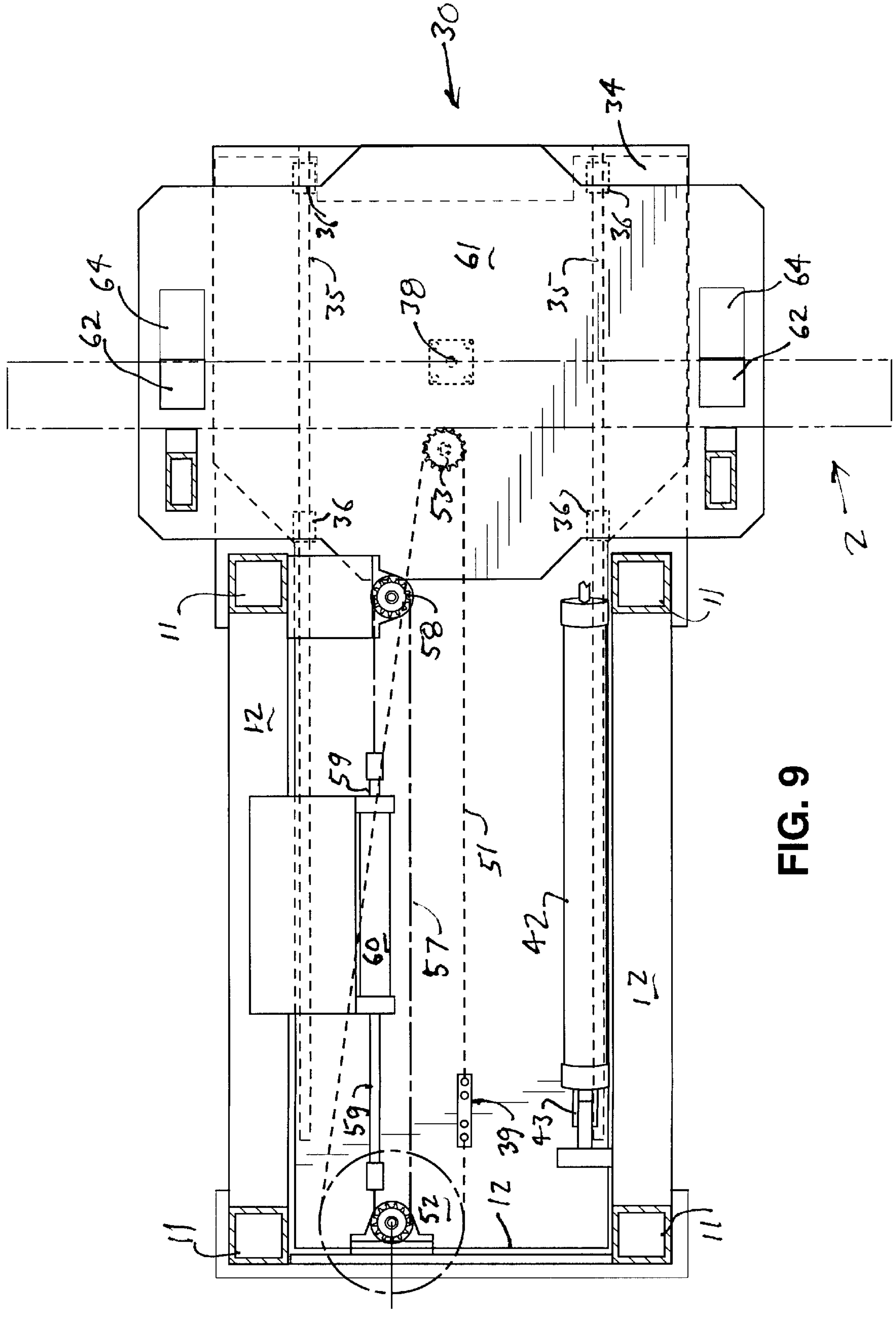
FIG. 9 is a sectional view of the inverter shown in FIG. 8, taken along lines 9—9.

Tilt table 20 tilts in the direction of its leading end 24. Thus, it is mounted for rotation between the horizontal and near vertical attitudes by means of a pair of bearings 40, one mounted on each of longitudinal frame members 22. Bearings 40 rotationally engage axle 41. Axle 41 is positioned a short distance beyond end 15 of stand 10 in the direction toward leading end 24 of tilt table 20. As best seen in FIG. 8, a piston 42 secured at one end by bracket 43 to a strut 12 of stand 10 and by bracket 44 at leading end 24 of tilt table 20. Actuation of piston 42 will cause tilt table 20 to rotate between the horizontal and near vertical attitudes.

Figure 10:
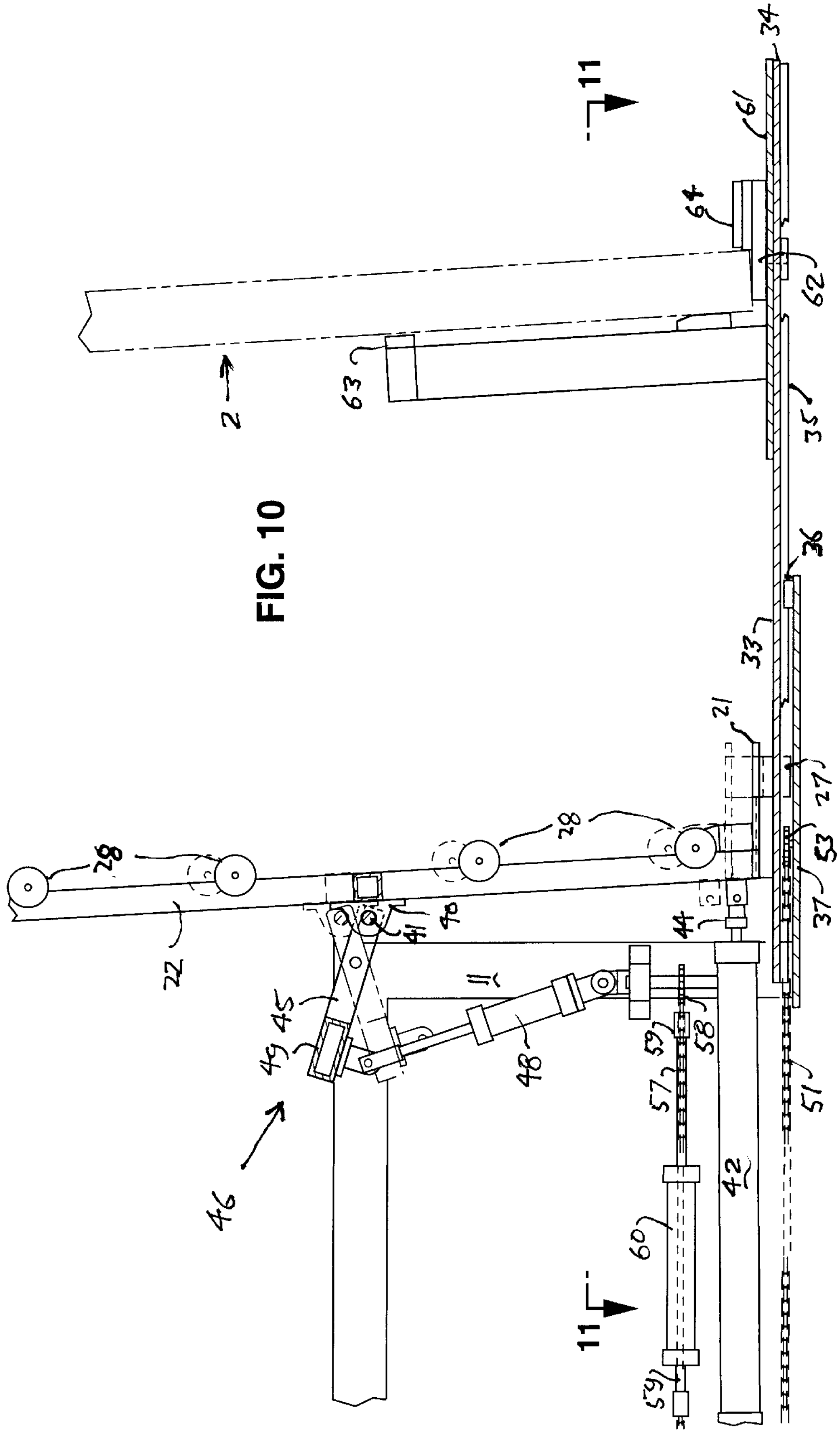
FIG. 10 is a fragmentary view of the inverter shown in FIG. 8, illustrating the tilt table tilted to the near vertical and, in solid lilies, at the transfer position for transferring the article to and from the carriage and, in phantom lilies, at a raised position for completing the transfer of the article back to the tilt conveyor, and illustrating the carriage at its fully extended position supporting an article for rotation.

As best seen in FIG. 10, at its near vertical attitude tilt table 2 remains at a slight angle, tilted back from the vertical, so that door unit 2 lying against it will also remain tilted back. This will maintain the center of gravity of door unit 2 behind its leading end 9 so that the unit will remain sitting on tilt table 20 without further propping.

Axle 41 is also rotationally engaged by arms 45 of rocker 46, with one arm 45 at the outer side of each bearing 40. Rocker 46 is rotationally mounted on stand 10 about two pivots 47 having the same axis, each pivot connecting one arm 45 with the respective beam 13 adjacent thereto. As illustrated in FIG. 10, rocker 4 is rotatable about the common axis of pivots 47 to raise and lower axle 41 between a raised position adjacent the top of stand 10 to a lowered position a distance therebelow. A piston 48 is secured at one end to rocker bar 49 and at the other to bracket 50 on a leg 11 of stand 10 to operate rocker 46 to raise and lower axle 41. As shown in FIG. 8, axle 41 is in the raised position when tilt table 20 is in the horizontal attitude lying on stand 10.

As seen in FIGS. 2. 5 and 8, bearings 40 are located a distance along tilt table 20 in the trailing direction from leading end 24. Thus when tilt table 20 is in the horizontal attitude lying on stand 10, leading end 24 thereof extends a distance outwardly of end 15 of stand 10. As axle 41 is located adjacent the top of stand 10, leading end 24 will be lowered to a position close to the bottom of stand 10, as seen in FIG. 2 and 10, when tilt table 20 is rotated to the near vertical attitude. Also as shown in FIG. 10, when tilt table 20 has been rotated to the near vertical attitude rocker 43 may be pivoted to lower axle 41 to a lowered position. This will lower tilt table 20, and with it leading end 24, a further distance toward the bottom of stand 10 (as shown in phantom lines).

Referring now to FIGS. 3, 4 and 8–13, carriage 30 comprises a tongue 32 having a shank 33 and platform 34 for a rotatable carrier or turntable 31. Shank 33 is slidably mounted by tracks 35 on its underside on trackways 36 carried by apron 37 for movement of platform 34 horizontally toward and away from stand 10 in a travel direction parallel to the longitudinal axis of tilt table 20. Apron 37 is fixed to the bottom of legs 11 at leading end 9 of stand 10 and it extends in the tongue 32 travel direction a distance both under stand 10 and outwardly beyond end 15 thereof to provide a bearing for shank 33. Shank 33 extends under stand 10 when tongue 32 is in a retracted position and is of sufficient length in the tongue travel direction to allow movement of platform 34 to an extended position a desired distance away from stand 20, as will be discussed.

As best seen from FIGS. 4, 6 and 8–11, tongue 32 is moved between its retracted and extended positions by means of endless chain 51. Chain 51 engages sprocket wheel 52 attached to a strut 12 of stand 10 and sprocket wheel 53 attached to apron 37 to provide a chain path in the travel direction of tongue 32. Chain 51 is attached at connector 39 to shank 33 at its trailing end so that movement of chain 51 moves tongue 32 along its travel path. As seen in FIG. 8, axle 54 for sprocket wheel 52, which is mounted for rotation in bearings 55, also bears sprocket wheel 56 mounted on axle 53 above sprocket wheel 52. Chain 57 that engages sprocket wheel 56 also engages sprocket wheel 58 and each end is connected to one of the two opposed piston rods 59 of two-way cylinder 60. Actuation of cylinder 60 moves chain 57 to rotate axle 54 and thereby move chain 51.

Figure 7:
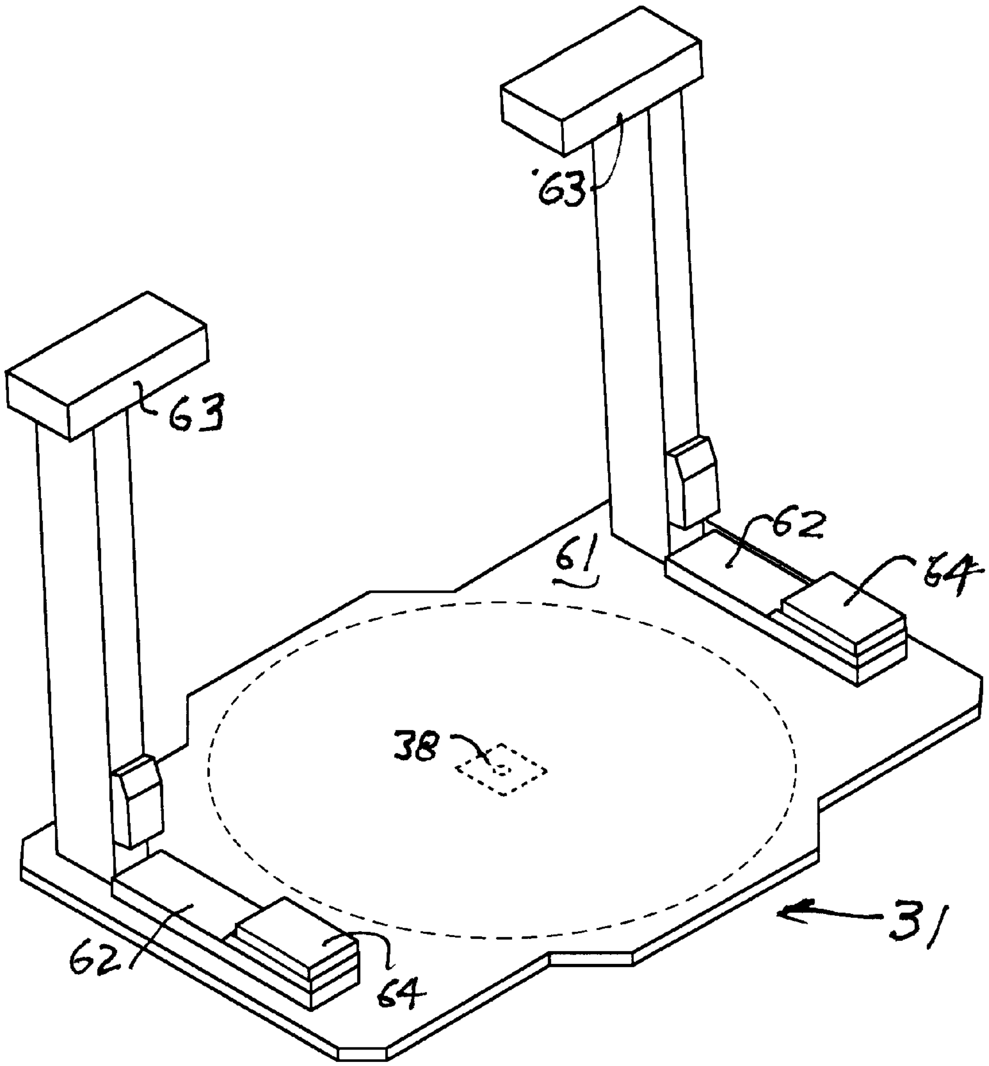
FIG. 7 is an enlarged view, in isolation, of the rotatable cradle of the carriage of FIG. 1.
Figure 11:
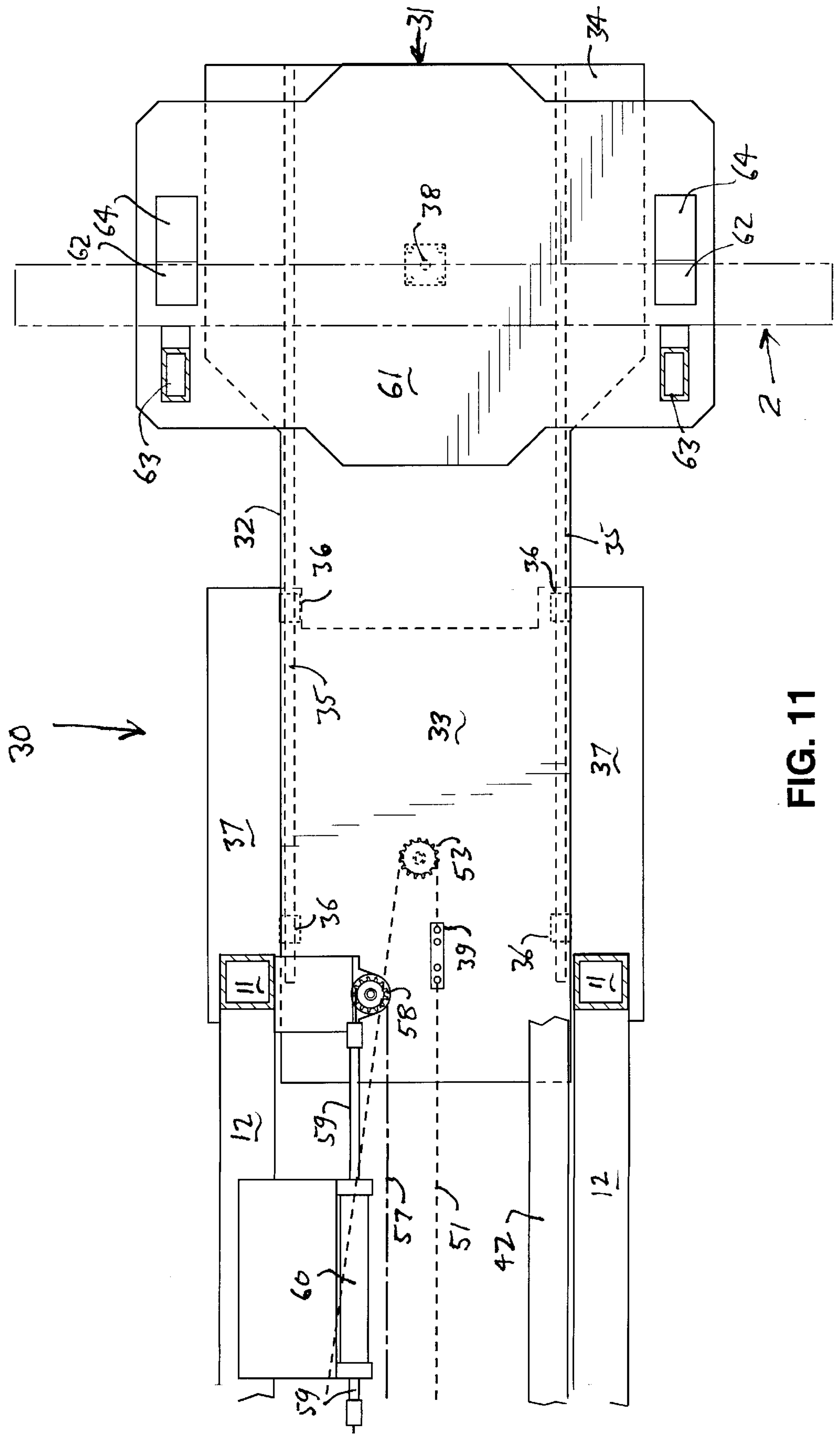
FIG. 11 is a sectional view of the inverter shown in FIG. 10, taken along lilies 11—1l.
Figure 12:
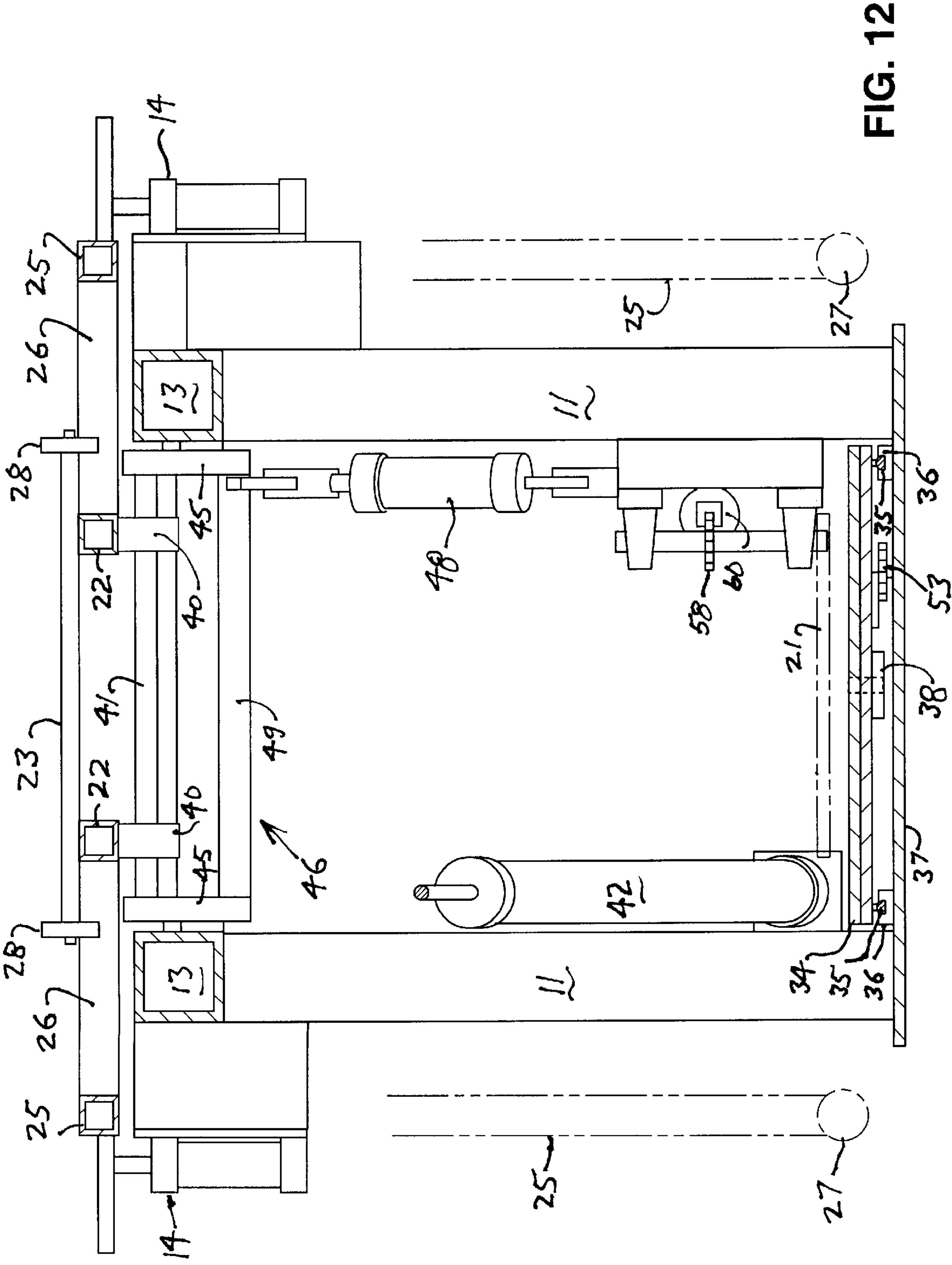
FIG. 12 is a sectional view of the inverter shown in FIG. 8, taken along lines 12—12, which shows, in phantom lines, lower portions of the tilt table at the near vertical position
Figure 13:
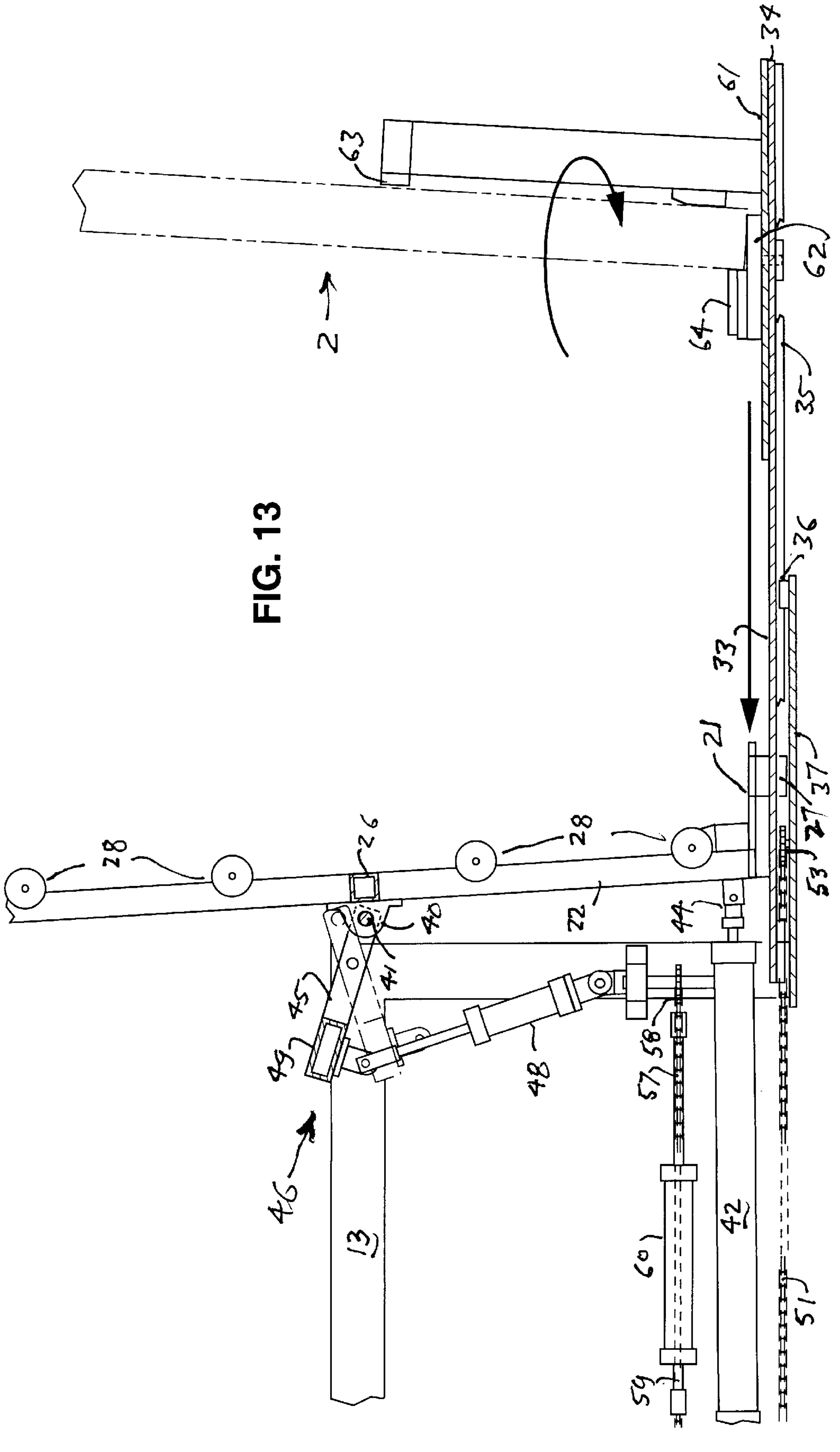
FIG. 13 is the sectional view of the inverter shown in FIG. 10, showing the cradle of the carriage, and the article supported thereby, rotated in preparation for retracting the carriage, and showing the tilt conveyer at its transfer position for receiving the article back from the carriage.

Referring particularly to FIGS. 7, 11 and 13, turntable 31 is mounted on platform 34 by axle 38 for rotation about a vertical axis. Turntable 31 comprises plate 61 bearing axle 38 and support elements for cradling a planate workpiece at a near vertical attitude. Those elements include ridges 62, which function as a seat for supporting leading end 9 of door unit 2 and props 63 that project upwardly from plate 61 at the back side of ridges 62 to support the back side of door unit 2 that leans at a slight angle against props 63. A cleat 64 is positioned at the forward side of each ridge 62 to abut the forward edge of leading end 9 of door unit 2 as a curb or stop means to prevent the leading end from sliding forward on plate 61 and causing door unit 2 to upset.

With tongue 32 in the retracted position and tilt table 20 is in the near vertical attitude, turntable 31 is in position to receive door unit 2 from tilt table 20. Props 63 are each on the outside of cross members 23 and inside of outriggers 25 on their respective sides and are in line with the top of tilt table 20. In this position ridges 62 on plate 61 lie side-by-side with support ledges 21 and to the outside thereof on their respective sides. As seen in phantom lines in FIG. 12. when axle 41 is in the raised position, support ledge 21 is a short distance above ridges 62 and uprights 27 on outriggers 25. As seen in phantom lines in FIG. 13, when rocker 46 is actuated to move axle 41 to its lowered position, support ledge 21 moves to a position below the tops of ridges 62, thereby transferring the support of leading end 9 of door unit 2 from support ledge 21 to ridges 62.

Reviewing the operation of inverter 1. Door unit 2 is first moved into place on tilt table 20 in the horizontal attitude as previously described. At this point axle 41 is in the raised position and tongue 32 is in the retracted position. Piston 42 is then actuated to move tilt table 20 to the near vertical attitude with door unit lying against it and with leading end 9 supported by ledge 21. Piston 48 is then actuated to operate rocker 46 to lower support ledge 21, transferring support of leading end 9 of door unit 2 to ridges 62. Cylinder 60 is then actuated to move tongue 32 from the retracted position to the extended position. As turntable 31 moves forward with tongue 32, props 63 engage the back of door unit 2, serving as a back rest to support it at the near vertical position on turntable 31 in cooperation with ledges 21 and cleats 64.

The operator then manually pivots turntable 31 a half turn to reverse the side of door unit 2 that faces tilt table 20. The extended position of carriage 30 is far enough away from tilt table 20 at least one half the width of door unit 2, (preferably further) so that there is clearance for rotation. Cylinder 60 is then actuated in the opposite direction to move tongue 32 back to the retracted position with support ledge 21 below leading end 9 of door unit 2. The operator then manually tips door unit 2 off of props 63 and toward tilt table 20 so that it leans thereagainst. Following this piston 48 is actuated to operate rocker 46 to raise support ledge 21, transferring support of leading end 9 of door unit 2 back to support ledge 21. Cylinder 60 is once more actuated to move tongue 32 from the retracted position to the extended position in order to provide clearance for pivoting tilt table 20 back to the horizontal attitude.

Piston 42 is then actuated to move tilt table 20 to the near horizontal attitude. Turntable 31 is then manually rotated degrees and carriage 30 again retracted to its original position in readiness for receiving another workpiece. After the completion of any fabrication procedures desired on its upper side, door unit 2 may be moved horizontally off of tilt table 20 for further processing elsewhere.

It will be seen that in the preferred embodiment of the invention the planate article at the near vertical attitude is still slanted from the vertical and thus the tilt table and against the backrests on the turntable of the carriage. This posture is advantageous as it avoids the need to provide further support at the front side of the article. However, if desired, the article may be supported at an essentially vertical posture by providing additional supports for the front side, as needed, to prevent the article from tipping over in the front direction. Thus, it is to be understood that, as used herein, the term “near vertical attitude” includes an attitude that is essentially vertical. Also, if desired, other means of transferring support between the tilt table and carriage may be used. Such means well within the skill of the art include providing either a seat on the carriage or a ledge at the leading end of the tilt table that is moveable vertically to effect the transfer.

In the preferred embodiment the apparatus as depicted, articles are fed horizontally onto the tilt table for inversion and then moved off again horizontally after inversion. The apparatus of this invention may also be utilized advantageously for feeding articles onto and off of the tilt table by means of the carriage. Thus, for feeding articles, the carriage may be placed at its extended position with the carrier rotated to the position shown in FIG. 2 and the article then placed on the carrier in the position shown in FIG. 2, either manually or by other equipment, such as a fork lift. The carriage may then be retracted and the article transferred to the tilt conveyor for rotating it to a horizontal attitude on the inverter for fabrication procedures or the like.

For feeding articles off of the apparatus, an article fed to the horizontal tilt table can be rotated to the near vertical and moved on the carriage to the extended position and rotated to the position shown in FIG. 2. Then the article may removed from the carrier either manually or with other equipment. The extended position of the carriage away from the stand facilitates loading or removal of the article and provides more clearance for the times of a fork lift.

What is claimed is:

1. An inverter for inverting to an upside down orientation a planate article which comprises means for supporting the article in a horizontal attitude and for tilting the article downwardly at a leading end from the horizontal to a near vertical attitude with the leading end at a transfer location and back upwardly at the leading end from the near vertical attitude to the horizontal, a carriage for receiving the article from and returning the article to the transfer location at the near vertical attitude and for moving the article to and from a rotation location a horizontal distance away from the transfer location, the carriage being moveable between the transfer location and the rotation location and means associated with the carriage for supporting the planate article at a near vertical attitude and for rotating the article about a vertical axis when the article is on the carriage at the rotation location, whereby the article may be tilted from the horizontal attitude to a near vertical attitude with a leading edge at the transfer location, where it is transferred to the carriage, moved on the carriage to the rotation position, rotated 180 degrees by the near vertical support and rotation means, moved back to the transfer location by the carriage to be received and moved back to the horizontal attitude in an inverted orientation by the supporting and tilting means.

2. An inverter as in claim 1 and wherein the means for supporting the article at a near vertical attitude and rotating the article supports the article at the leading end thereof.

3. An inverter as in claim 2 and wherein the means for supporting the article at a near vertical attitude and rotating the article comprise a turntable having a cradle for cradling the article at the leading end thereof.

4. An inverter as in claim 2 and wherein the means for supporting the article in a horizontal attitude and for tilting the article comprises a tilt table rotatable for reciprocation between a horizontal support position and a near vertical transfer position.

5. An inverter as in claim 4 and wherein the tilt table is provided with means for retaining the article on the tilt table when the tilt table is tilted from the horizontal to the near vertical position.

6. An inverter as in claim 4 and wherein the tilt table is provided with conveyor means for conveying planate articles horizontally onto and off of the tilt table when the tilt table is in the horizontal support position.

7. An inverter for inverting to an upside down orientation a planate article which comprises a tilt table for supporting the article at the underside thereof in a horizontal attitude and for tilting the article downwardly at a leading end from the horizontal to a near vertical attitude with the leading end at a transfer location and back upwardly at the leading end from the near vertical attitude to the horizontal, the tilt table being tiltable for reciprocation between a horizontal support position and a near vertical transfer position, a carriage for receiving the article from and returning the article to the tilt table at the transfer location at the near vertical attitude and for moving the article to and from a rotation location a horizontal distance away from the transfer location, the carriage being moveable between the transfer location and the rotation location, the carriage having a turntable rotatably mounted thereon for rotation about a vertical axis for supporting the planate article at a near vertical attitude and for rotating the article about a vertical axis when the article is on the carriage at the rotation location, whereby the article may be tilted from the horizontal position on the tilt table, by tilting the tilt table, to a near vertical attitude with a leading end at the transfer position where it is received on the turntable of the carriage, moved on the carriage to the rotation position, rotated 180 degrees on the turntable, moved back to the transfer location where the article may be again supported on the tilt table and moved back to the horizontal attitude in an inverted orientation.

8. An inverter as in claim 7 and wherein the tilt table is provided with means for retaining the article on the tilt table when the tilt table is tilted from the horizontal to the near vertical position.

9. An inverter as in claim 8 and wherein the means for retaining the article on the tilt table comprises a curb on the tilt table for engaging the leading end of the article.

10. An inverter as in claim 9 and wherein the turntable comprises a seat for supporting the leading end of the article.

11. An inverter as in claim 10 and wherein the turntable further comprises a cradle for supporting the article by cradling the leading end thereof.

12. An inverter as in claim 10 and wherein the turntable further comprises a back support located horizontally at a first side of the seat and extending a vertical distance thereabove for supporting one planar side of the article and stop means located horizontally at a second side of the seat opposed to the first side for engaging the leading end of the article at the other planar side of the article, whereby to cradle the leading end of the article between the back support, the seat and the stop means.

13. An inverter as in claim 10 and wherein the curb on the tilt table is a distance above the seat on the turntable when the tilt table is at the near vertical transfer position and the carriage is at the transfer location and means are provided for raising and lowering the tilt table between the near vertical transfer position and a lowered position at which the curb is below the seat on the turntable when the tilt table is at the near vertical transfer position and the carriage is at the transfer location, whereby support of the leading end of the article may be transferred between the curb of the tilt table and the seat of the turntable by raising and lowering the tilt table.

14. An inverter as in claim 13 and wherein the means for raising and lowering the tilt table comprises a first pivot transverse to the tilt direction which supports the tilt table and about which the tilt table pivots for reciprocation between the horizontal support position and the near vertical transfer position and means for raising and lowering the pivot between a higher position, at which the tilt table may be tilted to the near vertical transfer position, and a lower position, at which the tilt table is at the lowered position.

15. An inverter as in claim 14 and wherein the means for raising and lowering the pivot comprises a second pivot transverse to the tilt direction and at least one pivot arm pivotably mounted to the first pivot and to the second pivot for supporting and moving the first pivot between the higher and lower positions.

16. An inverter as in claim 7 and wherein the tilt table is provided with conveyor means for conveying planate articles horizontally onto and off of the tilt table when the tilt table is in the horizontal support position.

17. A method for inverting to an upside down orientation a planate article supported at a horizontal attitude at a station for tilting the article from the horizontal to and from a near vertical attitude which comprises tilting the article at the tilting station downwardly at a leading end to a near vertical attitude, maintaining the article at the near vertical attitude while moving the article to a location a distance horizontally away from the tilting station to provide sufficient clearance to rotate the article, rotating the article a half turn and returning the rotated article back to the tilting station and tilting the article upwardly at the leading end back to a horizontal attitude.

18. A method as in claim 17 and wherein the article is supported along the underside thereof while at a horizontal attitude and during tilting thereof between the horizontal and near vertical attitudes and at the leading end thereof during rotation of the article and during movement of the article to and from the location distant from the tilting location for rotation.

19. A method as in claim 18 and wherein the article is elongate both in the tilting direction and transverse to the tilting direction.

* * * * *